United States Patent [19]

Rasmussen et al.

[11] 4,059,321

[45] Nov. 22, 1977

[54] PULL-OUT RECEPTACLE FOR FLOOR DUCTS

[75] Inventors: Harry R. Rasmussen, Tacoma; Kenneth D. Topel, Puyallup, both of Wash.

[73] Assignee: Crest Industries, Inc., Puyallup, Wash.

[21] Appl. No.: 733,207

[22] Filed: Oct. 18, 1976

[51] Int. Cl.² .................. H01R 13/44; H02G 3/22
[52] U.S. Cl. ..................................... 339/34; 174/48
[58] Field of Search .................. 339/34, 35, 36, 39, 339/44; 174/48, 57; 220/3.7

[56] References Cited

U.S. PATENT DOCUMENTS

| 2,441,643 | 5/1948 | Mickler | 339/44 R |
| 3,646,244 | 2/1972 | Cole | 174/57 |

FOREIGN PATENT DOCUMENTS

| 1,615,645 | 5/1973 | Germany | 174/48 |

Primary Examiner—Roy Lake
Assistant Examiner—Neil Abrams
Attorney, Agent, or Firm—Christensen, O'Connor, Garrison & Havelka

[57] ABSTRACT

After discussion of prior art electrical terminations for floor ducts in which a plurality of electrical cables are located, a pull-out receptacle for such floor ducts is disclosed which includes a sleeve configured to be received in an aperture extending between a floor surface and the interior of the floor duct, with the sleeve having a circumferential flange adapted to overlie those portions of the floor surface adjacent to the floor aperture. A recess is provided in a top surface of the sleeve, and an aperture extends from that recess through the sleeve. A closure member is provided which includes a core configured to be received within the sleeve aperture with a reciprocative, sliding fit, and an integral cap configured to be received in the recess. A first passageway is provided in the core, and a second passageway in the cap, the second passageway communicating with the first passageway for allowing electrical cables to be pulled therethrough. If desired, an electrical connector may be located in the first passageway so that telephone instruments or the like may be easily connected and disconnected when the closure member is withdrawn from the sleeve.

27 Claims, 8 Drawing Figures

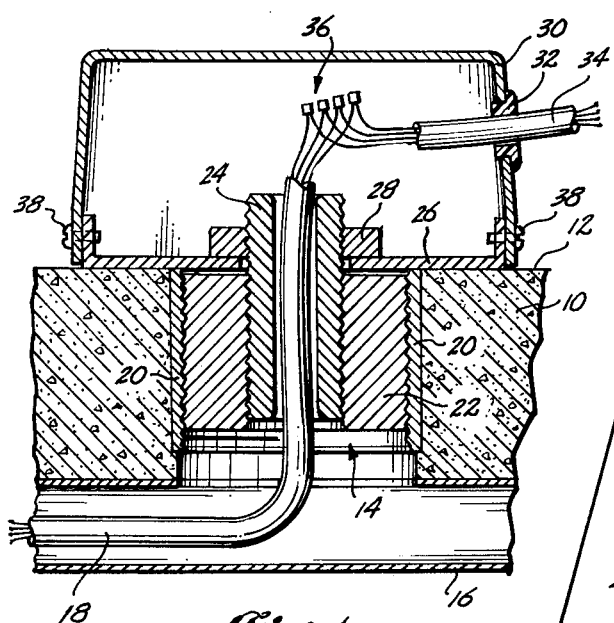
Fig. 1.
(PRIOR ART)
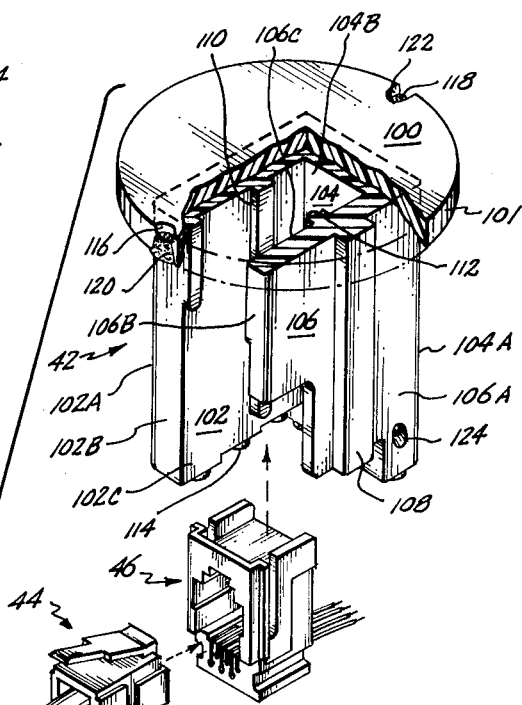
Fig. 2.
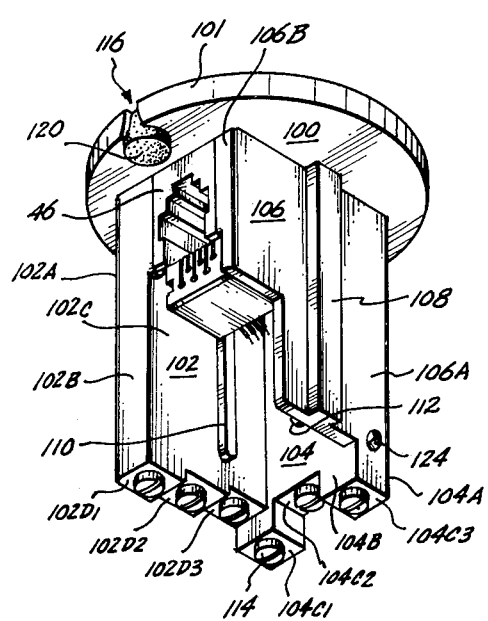
Fig. 3.
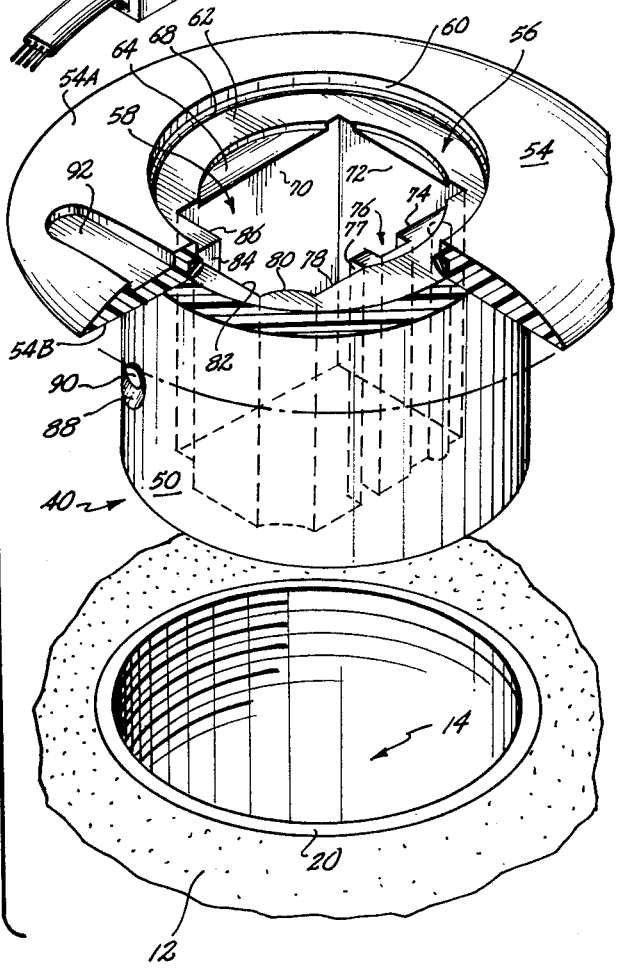

PULL-OUT RECEPTACLE FOR FLOOR DUCTS

FIELD OF THE INVENTION

This invention generally relates to electrical receptacles, and, more particularly, to such receptacles which are designed to be mounted in a floor having a duct therein for permitting access to be made to the duct and to electrical cables therein.

BACKGROUND OF THE INVENTION

Many industrial and commercial buildings are now being constructed with a plurality of ducts located in the floors of such buildings. In a typical arrangement, the ducts extend parallel to each other and are spaced at predetermined intervals. Each duct contains a number of communications and power cables. To provide interconnection of these cables to various communications instruments such as telephone desk sets, to electrical power outlets, and the like, an electrical termination is provided in proximity to and communicating with one of the ducts at each desired location.

Referring now to FIG. 1, which illustrates a typical such electrical termination of the prior art, a floor 10 has an upper floor surface 12, with a substantially cylindrical aperture 14 extending from upper surface 12 through floor 10 and into a duct 16 in which a plurality of cables, such as cable 18, are located. Although duct 16 is illustrated in FIG. 1 as comprising a metallic, rectangular duct, it may in practice comprise any passageway within or underneath the floor 10 through which cables such as cable 18 extend. Typically, the cylindrical aperture 14 is formed in floor 10 at a location aligned with duct 16 where a telephone outlet or electrical power outlet is desired. The aperture 14 may be formed in place when the floor 10 is constructed, or may be formed at a later time by cutting out the floor 10 by the use of a hole saw or like apparatus. In most cases, an internally threaded cylindrical sleeve 20 is pressed into the aperture 14, with the aperture 14 being closed, if the electrical termination is not to be used, by an externally threaded disc, not illustrated, engaging sleeve 20. The top of this disc is flush when installed with the upper surface 12, so that passage across the floor surface 12 is not obstructed.

When the electrical termination is to be used, the disc is removed and a cable such as cable 18 pulled up through aperture 14 from the duct 16. An externally threaded conduit or nipple 24 is then threaded into an internally threaded aperture of a substantially cylindrical adapter 22 whose diameter approximates that of the sleeve 20 and which has external threads thereon for engaging the corresponding threads of the sleeve 20. The cable 18 is pulled through the conduit 24, and the assembly including adapter 22 is then threaded into the sleeve 20, with the upper end of the conduit 24 protruding above the floor surface 12. A base member or plate 26 having a central aperture is then placed over the protrusion of conduit 24 and is secured to the floor 10 by a nut 28 through which the cable 18 is passed and which is threaded onto the conduit 24 to press the base member or plate 26 against the floor surface 12. To make an electrical interconnection with an instrument such as a telephone desk set, a cable 34 from that desk set is passed through a grommeted aperture 32 in the side of the housing 30, with the conductors in the cable 34 being interconnected with a corresponding number of conductors in the cable 18 by means of a plurality of splices 36. Alternatively, electrical connectors may be used in place of splices 36, or, the cable 18 may itself be pulled through the grommeted aperture 32 and terminated in an electrical connector external to the housing 30. The housing 30 is secured to the base member or plate 26 by a plurality of fasteners 38.

Although functioning to provide electrical interconnection between a telephone desk set and the like and a cable located within the duct, the electrical termination of the prior art as typified by that illustrated and discussed with respect to FIG. 1 has proved disadvantageous in many respects.

As an example, the electrical terminations of the prior art are often difficult to install. The internal threads of the sleeve 20 often become encrusted with concrete and other foreign material, especially where it is installed at the time the floor 10 is constructed, which foreign material must be removed before the assembly including adapter 22 can be installed. Time and skill are also required to properly assemble the numerous components of the prior art electrical terminations and to make the necessary electrical interconnections, such as by splices 36 or otherwise. Accordingly, the services of a trained and competent technician are almost always required on the initial installation of such a prior art electrical termination. Most important, such services are also required whenever the instrument, such as a telephone desk set, utilizing a particular electrical termination is to be moved or changed. In many industrial plants which have a very large number of telephone desk sets which are constantly being disconnected and connected due to changes in the physical location of personnel working in that plant, significant costs resulting from the services of trained technicians are incurred in effecting such disconnections and connections with the electrical terminations of the prior art.

As can be readily appreciated by those skilled in the art, a prior art electrical termination such as that illustrated and discussed with respect to FIG. 1 is costly insofar as it includes a number of separate components, each of which requires an individual manufacturing step for its formation. Moreover, a prior art electrical termination as in FIG. 1 often times presents a safety hazard when installed, since the housing 30 protrudes above the floor surface 12, thereby providing an obstruction to passage.

It is therefore an object of this invention to provide a receptacle functioning as an electrical termination for floor ducts which overcomes the disadvantages previously stated of the prior art.

It is a further object of this invention to provide such a receptacle which is inexpensive to manufacture and which includes fewer components than the electrical terminations of the prior art.

It is yet a further object of this invention to provide such a receptacle which is easy to initially install, and which also allows a relatively unskilled person to connect and disconnect an instrument such as a telephone desk set at the receptacle.

It is another object of this invention to provide such a receptacle which is rugged in construction, which is substantially liquid-resistant, and which is substantially flush with a floor surface when installed.

SUMMARY OF THE INVENTION

Briefly, these objects and others which will be realized from a consideration of the following portions of the specification are achieved in part by a pull-out receptacle for floor ducts, the receptacle being adapted to be mounted in a floor aperture extending from a floor surface to and into the floor duct, and being adapted when so mounted to permit access to be made to the floor duct and to electrical cables therein from the floor surface. The receptacle comprises a sleeve means including an upper flange for overlying portions of the floor surface which are adjacent to the floor aperture. A lower wall means is integral with and dependent from the flange and is configured to be received within the floor aperture. A first recess is defined in the flange and extends inwardly into the sleeve, and a first aperture, having a cross-sectional area which is less than the cross-sectional area of the first recess, is defined in the flange and in the wall means and extends through the sleeve means, with the first aperture communicating at one end thereof with the first recess. Means are provided for securing the sleeve means to the floor when mounted in the floor aperture. A closure member includes a cap configured to be received in the first recess of the sleeve means. A core, integral with and dependent from the cap, is configured to be received in the first aperture of the sleeve means with a reciprocative, sliding fit. A first passageway for electrical cables extends through the core and a second passageway for electrical cables extends through the cap and communicates with the first passageway.

BRIEF DESCRIPTION OF THE DRAWINGS

The invention can perhaps best be understood by reference to the following portions of the specification taken in conjunction with the accompanying drawings in which:

FIG. 1 is a cross-sectional view of the prior art electrical termination as installed and as previously discussed;

FIG. 2 is an exploded, pictorial view of the components including a sleeve and a closure member of a receptacle constructed according to the teachings of the present invention;

FIG. 3 is a second pictorial view of the closure member;

DESCRIPTION OF A PREFERRED EMBODIMENT

Figure 4:
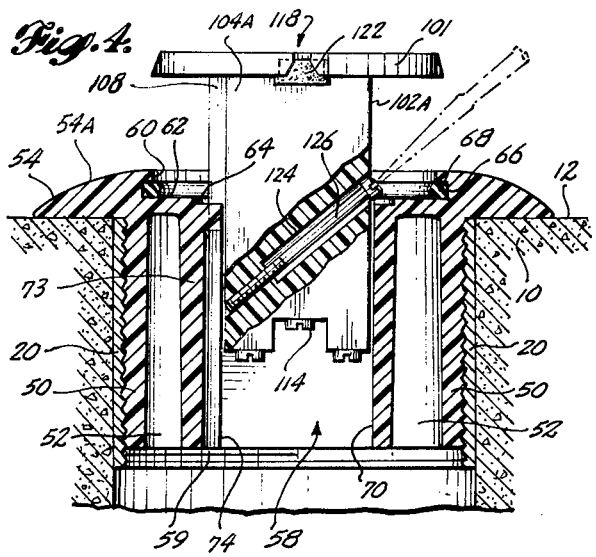
FIG. 4 is a cross-sectional view showing the receptacle of FIG. 1 as installed and with the closure member thereof in a first, uninstalled condition.

In FIG. 2, the invention is seen to comprise a sleeve 40 configured to enter into the aperture 14 and engage with the sleeve 20 therein, and to additionally overlie a portion of the floor surface 12 adjacent the aperture 14, and a closure member 42 which is reciprocative within sleeve 40 and which includes provision for mounting a standardized female connector 46 therein which connects to a cable within the duct 16 such as cable 18, with easy connection and disconnection of instruments such as telephone desk sets being afforded by a complementary male connector 44 which terminates a cable to the instrument.

Figure 7:
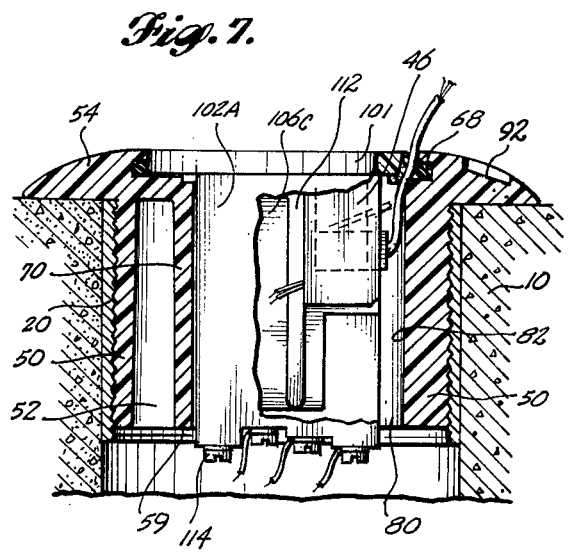
FIG. 7 is a cross-sectional view of the receptacle taken along the lines 7—7 in FIG. 6.

The closure member 42, when installed within sleeve 40, can be moved from a first position in which the top thereof is flush with the top of sleeve 40 (reference FIGS. 5 and 7) to a second position wherein the top of the closure member 42 is elevated above the top of sleeve 40 (reference FIG. 4) to permit access to the female connector 46 therein.

With reference now to FIG. 2, and FIGS. 4–8, the sleeve 40 includes an outer wall member 50 having a peripheral, substantially cylindrical outer surface 51 whose diameter is slightly less than that of the sleeve 20 installed in the floor 10. Integral with and extending from one end of the outer wall member 50 is a circumferential flange 54 having an upper surface 54A which slopes downwardly from a central recess 56 therein, and a substantially planar lower surface 54B which extends outwardly from a juncture with cylindrical outer surface 51 of wall member 52 to a juncture with upper surface 54A. A recess 92 is provided in upper surface 54A for receiving a nameplate or other marker for identifying the receptacle location.

The recess 56 is defined by a substantially cylindrical side wall 60 extending downwardly from its juncture with upper surface 54A, a substantially planar floor 62 extending inwardly from its juncture with side wall 60, with the floor 62 having a cylindrical, indented recess 64 centrally located within.

An aperture 58 extends through the sleeve 40 from the floor 62 of recess 56 to a lower, substantially planar surface 59 of the wall member 50, with relief areas 52 being provided in the wall member intermediate the outer surface 51 thereof and the surfaces defining aperture 58.

A recess 66 is provided in the side wall 60 for receiving and retaining a flexible O-ring 68 used to seal the top of the closure member 42 as hereinafter described, with the recess 56 in aperture 58 being configured to receive an upper cap 100 of the closure member 42.

The aperture 58 is defined by a plurality of generally orthogonal surfaces, including a first, substantially planar side surface 70, a first, substantially planar end surface adjoining surface 70, a second, substantially planar side surface 74 adjoining surface 72 and a second, substantially planar end surface 86 adjoining surface 70. At the projected points where side surface 74 and end surface 86 would meet, the recess 58 is cut away and defined by a substantially planar surface 77 adjoining side surface 74, an indented, substantially planar side surface 89 adjoining surface 77, a semi-cylindrical surface 80, an adjoining surface 78, a substantially planar, indented end surface 82 adjoining semi-cylindrical surface 80, and a second, substantially planar, indented side surface 84 adjoining both surface 82 and surface 86. A substantially rectangular groove 76 is provided in side surface 74 in proximity to indented end surface 77 and extends from the floor 64 to the bottom surface 59, and a second, semi-cylindrical groove 73 is provided in side surface 74 intermediate groove 76 and the juncture of surface 74 with surface 72, with groove 74 extending from a point just below floor 64 to the bottom surface 59.

The sleeve 42 is completed by a bore 88 extending downwardly through the wall member 50 from second end surface 86 of aperture 58 to the outer surface 51 of wall member 50, with a machine screw 90 being contained within bore 88 and having its head exposed through end surface 86 within aperture 58.

The closure member 42 (FIGS. 2-8) includes the upper cap 100 formed into a substantially cylindrical disc which is configured to be received within the recess 56 of the sleeve 40, and a lower core comprising orthogonal core walls 102, 104 and 106 downstanding from and integral with cap 100, with the core being configured to be received within the aperture 58 in sleeve 40. When viewed in plan, the core walls 102, 104 and 106 are arranged in a substantial U-shaped, and if provided with an additional core wall adjoining the ends of walls 102 and 106, would define a parallelopiped generally complementary to the parallelopiped-shaped aperture 58. It will be noted that the core walls 102, 104 and 106 therefore define therebetween a passageway for electrical cables.

Figure 6:
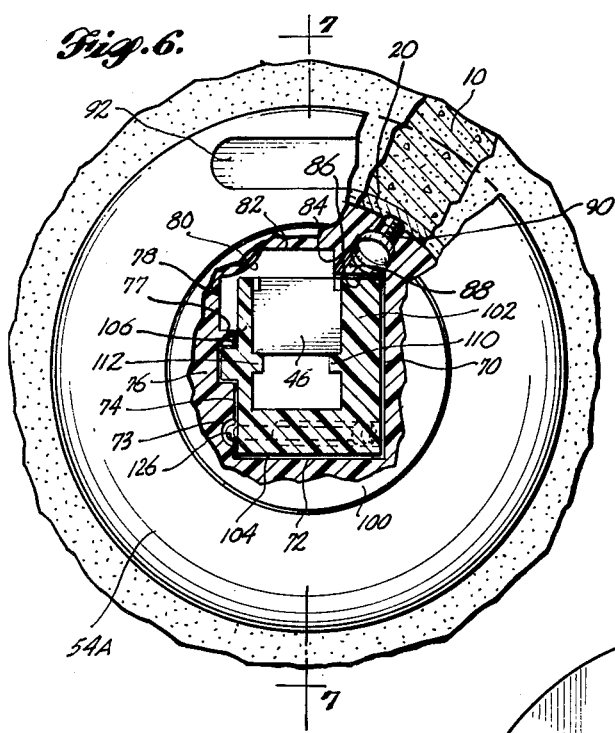
FIG. 6 is a top plan view of the receptacle of FIG. 1 as installed and with a portion thereof cutaway to illustrate the relationship of the sleeve and closure member thereof and the securement of the sleeve to a floor.
Figure 8:
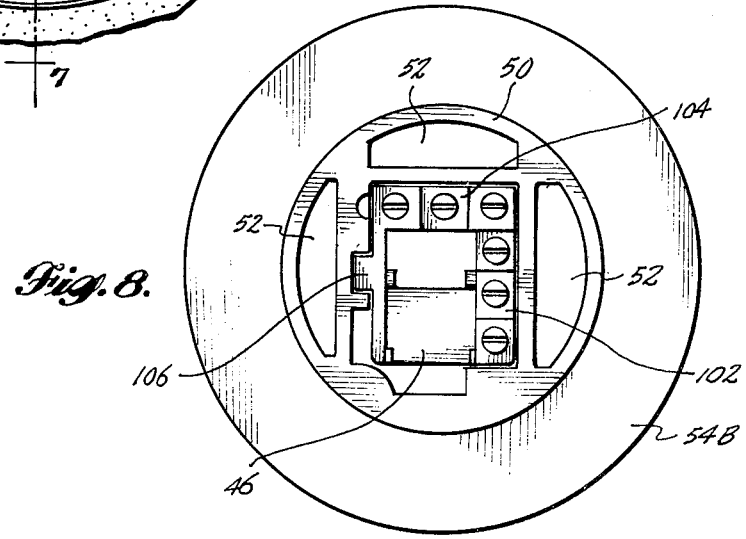
FIG. 8 is a bottom plan view of the receptacle of FIG. 1.

The core wall 102 has an outer wall surface 102A and an adjoining end wall surface 102B which are generally complementary, respectively, to surfaces 70 and 86 of recess 58, and an inner wall surface 102C. Likewise, the second core wall 104 has an outer wall surface 104A generally complementary to surface 72 of recess 58. The third core wall 106 has an outer wall surface 106A generally complementary to surface 74 of recess 58, an end wall surface 106B which is substantially coplanar with end wall surface 102B of core wall 102, and an inner wall surface 106C. An inner wall surface 104B of second core wall 104 adjoins both inner wall surface 102C and 106C. The wall surfaces 102A, 102B, 102C, 104A, 104B, 106A, 106B, and 106C are all substantially planar. Accordingly, as best illustrated in FIGS. 6 and 8, a smooth reciprocative or sliding fit is afforded between the closure member 42 and the sleeve 40 when the core including the core walls 102, 104 and 106 is inserted into the aperture 58 through the recess 56. To limit the amount of sideways rocking of the closure member 42 that is possible due to the clearances that must exist between the complementary surfaces of the three core walls 102, 104 and 106 and the recess 58 to permit such a smooth, sliding fit, a substantially rectangular tongue 108 is integral with the third core wall 106 and extends from outer wall surface 106A thereof, the tongue 108 being located along surface 106A so as to be received in recess 76.

First and second, parallel ridges 110, 112 are integral with first and third core walls 102, 106 and extend from inner wall surfaces 102C, 106C, respectively. The separation between inner wall surfaces 102C and 106C, and the separation between ridge 110 and end wall surface 102B, and ridge 112 and end wall surface 106B, are chosen to correspond substantially to the dimensions of the female connector 46 which is of a type disclosed in U.S. Pat. No. 3,850,497, Krumreich et al., which is expressly incorporated by reference herein, and which is currently available as a standardized model 623 P connector from the Western Electric Company. Generally, such a female connector has a body having a substantially parallelopiped configuration with a central connector-receiving cavity therein, with a plurality of electrical contacts being located within the cavity and interconnecting with a plurality of electrical leads. Preferably, the aforementioned separations should be chosen so that the body of the connector 46 can be retained between the first and third core walls 102, 106 by frictional engagement with the inner wall surfaces 102C, 106C thereof and with a rear surface of the body abutting the ridges 110, 112 so that the front surface of the body is substantially flush with the end wall surfaces 102B, 106B.

The first and second core walls 102, 104 are provided with a plurality of lower surfaces 102D1, 102D2, 102D3, 104C1, 104C2, and 104C3, with each lower surface having located therein an aperture for receiving the shank of a machine screw 114. Accordingly, each of the plurality of lower surfaces 102D1, 102D2, 102D3, 104C1, 104C2 and 104C3 in conjunction with its machine screw 114 functions as an electrical terminal to provide interconnection between one or more of the leads of the female connector 46 and the leads of any cable located within the duct, with adjoining ones of the plurality of lower surfaces 102D1, 102D2, 102D3, 104C1, 104C2 and 104C3 being staggered in elevation to provide electrical isolation between adjacent terminals.

The female connector 46 is particularly adapted for interconnection with a male connector 44 such as disclosed in U.S. Pat. No. 3,761,869, Hardesty et al. which is also expressly incorporated by reference herein. A passageway is provided in the cap 100 for a cable which extends from the male connector 44 to the instrument, with this passageway comprising a notch 116 provided in a circumferential side surface 101 of the cap 100. A second notch 118 is also provided in the surface 101 and spaced apart from the first notch 116 for providing a pry point for the closure member 42 when fully inserted into the sleeve 40, as hereinafter described. Both notches 116 and 118 are partially filled with a sealant material, such as foam rubber seals 120, 122, respectively. Finally, a bore 124 extends through the first, second and third core walls 102, 104 and 106 from the outer wall surface 102A downwardly to outer wall surface 104A, with the bore 124 containing a machine screw 126 whose head is exposed through outer surface 102A.

Preferably, sleeve 40 and closure member 42, with the exception of machine screws 90, 114, and 126, are formed from a dielectric, insulating material by a conventional injection molding process.

To initially install the receptacle of the present invention, a hole must have been formed in the floor to provide access into the underlying duct, with the hole having a diameter slightly larger than that of the cylindrical outer surface 51 of the sleeve 40. In the case where a sleeve such as sleeve 20 has already been installed in a suitable aperture 14, the disc therein is removed. Then, the cable that is desired for interconnection is pulled through the floor aperture and through the aperture 58 in the sleeve 40, with the sleeve 40 being thereafter installed by placing caulking between the lower surface 54B of the flange 54, inserting the wall member 50 into the aperture, and manually depressing the sleeve 40 until the flange 54 abuts the upper floor surface. Up to this time, the shank of the machine screw 90 will be wholly contained within the wall member 50. To secure the sleeve 40 to the floor, a screw driver is inserted into the recess 58 and into engagement with the head of the machine screw 90, and machine screw 90 is rotated thereby until the shank thereof protrudes from wall member 50 and comes into engagement with the side wall surface of the aperture, or, with the threads of the sleeve 20 therein.

The conductors of the cable that is desired for interconnection are stripped and fastened to the electrical terminals including machine screws 114 along with corresponding leads from the female connector 46.

Figure 5:
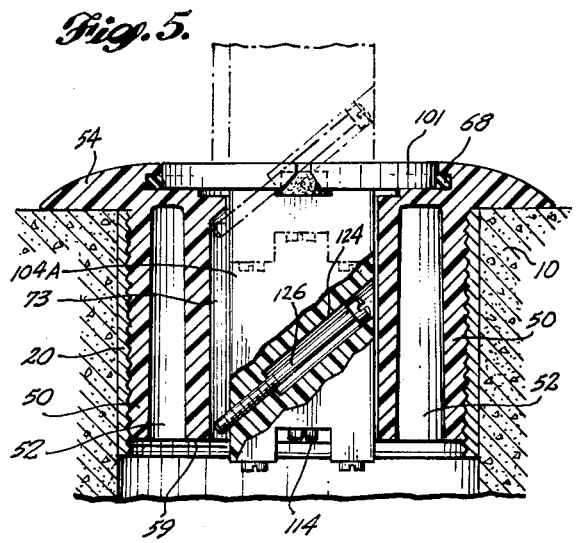
FIG. 5 is a cross-sectional view of the receptacle of FIG. 1 as installed and with the closure member thereof in a second, installed condition.

The closure member 42 is then inserted into the sleeve 40. As best illustrated in FIG. 4, the downward movement of the closure member 42 into the sleeve 40, and particularly, the downward movement of the core thereof including the first, second and third core walls 102, 104 and 106 into the aperture 58, is limited when the head of machine screw 126, which protrudes from surface 102A when the shank thereof is totally contained within the core, abuts the cylindrical indented recess 64 in the floor 62 of recess 66. Rotation of machine screw 126 by means of a screwdriver, as illustrated by the dashed lines in FIG. 4, causes the head of machine screw 126 to be totally recessed within the core, and the shank thereof to protrude from the core, and specifically from wall surface 106A and into the semi-cylindrical groove 73. At this time, the closure member 42 can be totally inserted into the sleeve 40, with the shank of machine screw 126 traveling in the groove 73, as best illustrated by the solid lines in FIG. 5. It will be noted that when closure 42 is fully inserted, the top surface of the cap 100 is flush with the upper surface 54B of flange 54, and the cap 100 is accordingly totally received within the recess 66, with the circumferential side surface 101 thereof engaging and deforming the O-ring 68 to provide a liquid-resistant seal. If desired, the circumferential surface 101 may be tapered outwardly from top to bottom to ensure better sealing.

When an electrical termination is to be made in the thus-installed receptacle, the closure member 42 is pried up from the sleeve 40 by using a screwdriver or other sharp object inserted into the notch 118. The upward movement of the closure member 42 is limited when the extended shank of machine screw 126 abuts the upper end of the groove 73, as illustrated in the dashed line portion of FIG. 5. The male connector 44 is then inserted into the female connector 46, which is now exposed, and the cable thereof is pressed into the notch 116 in cap 100. The closure member 42 is then again depressed into sleeve 40, with the cable terminating in the male connector 44 being partially contained within the cutaway portions of the recess 58 partially defined by surface 82, and being crimped between notch 116, side wall surface 60, O-ring 68, and floor 62 to again provide a liquid-resistant seal. It will thus be apparent to those skilled in the art that it is quite easy for the most unskilled person to electrically connect and disconnect an instrument using a receptacle of the present invention.

If desired, a receptacle constructed according to the teachings of the present invention may also be used in a manner similar to that of the prior art previously discussed, in which case the female connector 46 is dispensed with. In one instance, the cable desired for interconnection is brought up through aperture 58 in sleeve 40 and the conductors thereof are stripped and fastened to the electrical terminals on closure member 42, with the conductors of a cable going to the instrument also being stripped and fastened to those electrical terminals. In a second instance, the cable desired for interconnection is brought up through aperture 58 and terminated in a connector, or in an instrument, that is located above the floor surface. In either instance, a portion of the cable extending above the floor surface is retained within notch 116 so that a fluid-resistant seal is afforded upon depression of closure member 42 into sleeve 40, with the notch 116 being dimensioned in accordance with the dimension of the cable retained therein.

Although the invention has been described with respect to a preferred embodiment, it is to be clearly understood by those skilled in the art that the invention is not limited thereto, but rather is intended to be interpreted only in accordance with the following claims.

What is claimed is:

1. A pull-out receptacle for floor ducts, said receptacle being adapted to be mounted in a floor aperture extending from a floor surface to and into the floor duct and being adapted when so mounted to permit access to be made to the floor duct and to electrical cables therein from the floor surface, said receptacle comprising:
    a. sleeve means including an upper flange for overlying portions of the floor surface which are adjacent to the floor aperture; a lower wall means integral with and dependent from said flange and configured to be received within the floor aperture; a first recess being defined in said flange and extending inwardly into said sleeve means; a first aperture having a cross-sectional area which is less than the cross-sectional area of said first recess and being defined in said flange and in said wall means and extending through said sleeve means, said first aperture communicating at one end thereof with said first recess; and, means for securing said sleeve means to the floor when mounted in the floor aperture; and
    b. a closure member including a cap configured to be received in said first recess of said sleeve means; a core, integral with and dependent from said cap, which is configured to be received in said first aperture of said sleeve means with a reciprocative, sliding fit; a first passageway for electrical cables extending through said core and a second passageway for electrical cables extending through said cap and communicating with said first passageway.

2. A receptacle as recited in claim 1, further comprising an electrical connector which is mounted within said core so as to be in communication with said first passageway.

3. A receptacle as recited in claim 2, further comprising a plurality of electrical terminal means located on said core for permitting electrical connections to be made between said electrical connector and an electrical cable located within the floor duct.

4. A receptacle as recited in claim 1, wherein said wall means has a peripheral outer surface and a lower surface adjoining said peripheral outer surface; wherein said flange has a lower surface adjoining and extending from said peripheral outer surface of said wall means, and an upper surface adjoining said lower surface of said flange; wherein said first recess extends inwardly from said upper surface of said flange; and, wherein said first aperture extends between said first recess and said lower surface of said wall means.

5. A receptacle as recited in claim 4, wherein said means for securing said sleeve means comprises a bore extending from said first aperture through said wall means to said peripheral outer surface, and a fastener contained within said bore, said fastener having a head which is manipulatable through said first recess and said first aperture and a shank which engages a portion of the floor defining the floor aperture upon manipulation of said fastener.

6. A receptacle as recited in claim 4, wherein said peripheral outer surface is substantially cylindrical.

7. A receptacle as recited in claim 4, wherein said lower surface of said flange is substantially planar, and wherein said upper surface of said flange slopes downwardly from said first recess to a juncture of said upper surface with said lower surface of said flange.

8. A receptacle as recited in claim 4, wherein said cap comprises a disc having a substantially planar upper surface, an adjoining, substantially cylindrical side surface, and an adjoining, substantially planar lower surface, and wherein said first recess is defined by a substantially cylindrical side wall surface complementary to said side surface of said disc and an adjoining substantially planar floor, said surfaces of said disc and said first recess being configured so that said upper surface of said disc is substantially flush with said upper surface of said flange when said closure member is totally received within said sleeve and said lower surface of said disc is brought into contact with said floor of said first recess.

9. A receptacle as recited in claim 8, further comprising a second recess defined in said side wall surface of said first recess, and an O-ring received and retained in said second recess for engaging said side surface of said disc to provide a fluid-resistant seal.

10. A receptacle as recited in claim 9, wherein said side surface of said disc is tapered outwardly from said upper surface to said lower surface thereof.

11. A receptacle as recited in claim 8, wherein said peripheral outer surface of said wall means is substantially cylindrical, and wherein a juncture of said upper surface of said flange with said lower surface of said flange is substantially circular.

12. A receptacle as recited in claim 11, wherein said lower surface of said flange is substantially planar, and wherein said upper surface of said flange slopes downwardly from said first recess to said juncture.

13. A receptacle as recited in claim 4, wherein said cap has a substantially planar upper surface, a substantially planar lower surface, and a peripheral side surface adjoining said upper and said lower surfaces, and wherein said first recess is defined by a side wall surface complementary to said peripheral side surface of said cap and an adjoining, substantially planar floor, said aperture extending thrugh said floor, and said surfaces of said cap and said recess being configured so that said upper surface of said cap is substantially flush with said upper surface of said flange when said closure member is totally received within said sleeve means and said lower surface of said cap is brought into contact with said floor.

14. A receptacle as recited in claim 13, wherein said second passageway comprises a notch in said peripheral surface of said cap.

15. A receptacle as recited in claim 14, further comprising deformable sealing means contained within said notch for abutting said floor to provide a fluid-resistant seal when said cap is received within said first recess.

16. A receptacle as recited in claim 14, further comprising a second notch in said peripheral surface of said cap, said second notch being separated from said notch comprising said second passageway for providing a pry point for an instrument used to remove said closure member from said sleeve means.

17. A receptacle as recited in claim 16, further comprising first and second, deformable sealing means respectively contained within said notches for abutting said floor to provide a fluid-resistant seal when said cap is received within said first recess.

18. A receptacle as recited in claim 1, further comprising stop means having a first state for inhibiting insertion of said core into said first aperture through said first recess, and having a second state for limiting the relative reciprocative movement of said core in said first aperture upon insertion thereof.

19. A receptacle as recited in claim 18, wherein said stop means comprises a bore extending through said core; a fastener having a head and shank, a substantial portion of said fastener being contained within said bore; and a longitudinal recess in a surface of said sleeve means defining said aperture, said longitudinal recess extending from a point below said first recess downwardly in a direction parallel to the direction of reciprocative movement of said core in said first aperture; said head of said fastener protruding from said core in said first state to abut said first recess and said fastener being manipulatable so that a portion of said shank extends from said core and into said longitudinal recess and so that said head is totally contained within said bore in said second state.

20. A receptacle as recited in claim 1, wherein said first aperture and said core each have a substantially parallelopiped configuration.

21. A receptacle as recited in claim 20, wherein said core consists of first, second and third walls dependent from said cap, each of which is substantially orthogonal to said cap, with said first, second and third walls being arranged in a substantially U-shape in plan and defining therebetween said first passageway.

22. A receptacle as recited in claim 21, wherein said first, second and third walls have adjoining outer, substantially planar side wall surfaces, wherein said first and said third walls have outer, substantially planar end wall surfaces each adjoining its respective outer side wall surface, wherein said first, second and third walls have adjoining inner, substantially planar side wall surfaces facing and defining said first passageway, with said inner side wall surfaces of said first and third walls adjoining respective ones of said end wall surfaces, and wherein said first aperture of said sleeve means is defined by first, second, third and fourth adjoining, substantially planar side wall surfaces complementary respectively to said outer wall surfaces of said first, second and third walls and to said end wall surface of said first and third walls.

23. A receptacle as recited in claim 22 wherein a portion of said fourth side wall surface defining said first aperture and facing said first passageway is cut away to define a third passageway for electrical cables.

24. A receptacle as recited in claim 23, further comprising an electrical connector located between said first, second and third walls in said first passageway and facing said third passageway.

25. A receptacle as recited in claim 24, wherein said electrical connector has a substantially parallelopiped body which is retained within said first passageway by frictional engagement with said inner side wall surfaces of said first and third walls.

26. A receptacle as recited in claim 25, further comprising first and second ridges located on said inner side wall surfaces of said first and third walls each of said first and second ridges extending in a direction substantially parallel to the direction of reciprocative movement of said core in said first recess and being located with respect to said end wall surface of said first and third walls so that said electrical connector is flush with said end wall surfaces.

27. A receptacle as recited in claim 1, wherein said closure member and said sleeve means are formed from a dielectric, insulating material.

* * * * *